United States Patent
Nitta et al.

(10) Patent No.: US 6,243,861 B1
(45) Date of Patent: *Jun. 5, 2001

(54) OBJECT-ORIENTED VISUAL PROGRAM DEVELOPMENT SYSTEM FOR HANDLING PROGRAM ENTITY INCLUDING PRE-PROCESSING FUNCTION AND POST-PROCESSING SECTIONS

(75) Inventors: Tetsuji Nitta; Koji Hashimoto; Kiyoshi Yamanaka, all of Tokyo (JP)

(73) Assignee: Oki Electric Industry Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,066

(22) Filed: Feb. 5, 1998

(30) Foreign Application Priority Data

Apr. 23, 1997 (JP) .................................................. 9-106143

(51) Int. Cl.⁷ ........................................................ G06F 9/45
(52) U.S. Cl. .................................................... 717/3; 717/1
(58) Field of Search ..................................... 395/703, 701, 395/702, 705; 717/1, 2, 3, 5; 705/41; 345/348; 235/379

(56) References Cited

U.S. PATENT DOCUMENTS

| | | | |
|---|---|---|---|
| 4,443,861 | * 4/1984 | Slater | 710/8 |
| 4,660,168 | * 4/1987 | Grant et al. | 705/8 |
| 4,852,047 | * 7/1989 | Lavallee et al. | 364/191 |
| 4,901,221 | * 2/1990 | Kodosky et al. | 345/348 |
| 4,908,746 | * 3/1990 | Vaughn | 364/147 |
| 5,006,992 | * 4/1991 | Skeirik | 706/58 |
| 5,265,206 | * 11/1993 | Shackelford et al. | 395/683 |
| 5,382,777 | * 1/1995 | Yuhara et al. | 235/379 |
| 5,487,141 | * 1/1996 | Cain et al. | 345/435 |
| 5,576,946 | * 11/1996 | Bender et al. | 364/146 |
| 5,590,038 | * 12/1996 | Pitroda | 705/41 |
| 5,822,587 | * 10/1998 | McDonald et al. | 717/2 |
| 5,933,637 | * 8/1999 | Hurley et al. | 717/3 |
| 6,054,986 | * 4/2000 | Kato | 345/348 |

\* cited by examiner

Primary Examiner—Mark R. Powell
Assistant Examiner—Hoang-Vu Antony Nguyen-Ba
(74) Attorney, Agent, or Firm—Rabin & Champagne, P.C.

(57) ABSTRACT

A program development system which develops a program sequence by generating a diagram composed of a combination of icons, and which can apply an object-oriented scheme to the development of an application program for a parallel, real time processor. Each program entity symbolized by one of the icons includes a pre-processing section coded in a programming language for determining parameters in a message issued to an object; a function section for storing information about a linkage between the icon symbolizing the program entity and a procedure included in one of objects in an object library; and a post-processing section coded in a programming language for interpreting a message sent back from the object. When executing the program, each program entity is linked with the procedure in the object in the object library. This makes it possible to reduce coding labor, and to improve the quality of the program.

19 Claims, 17 Drawing Sheets

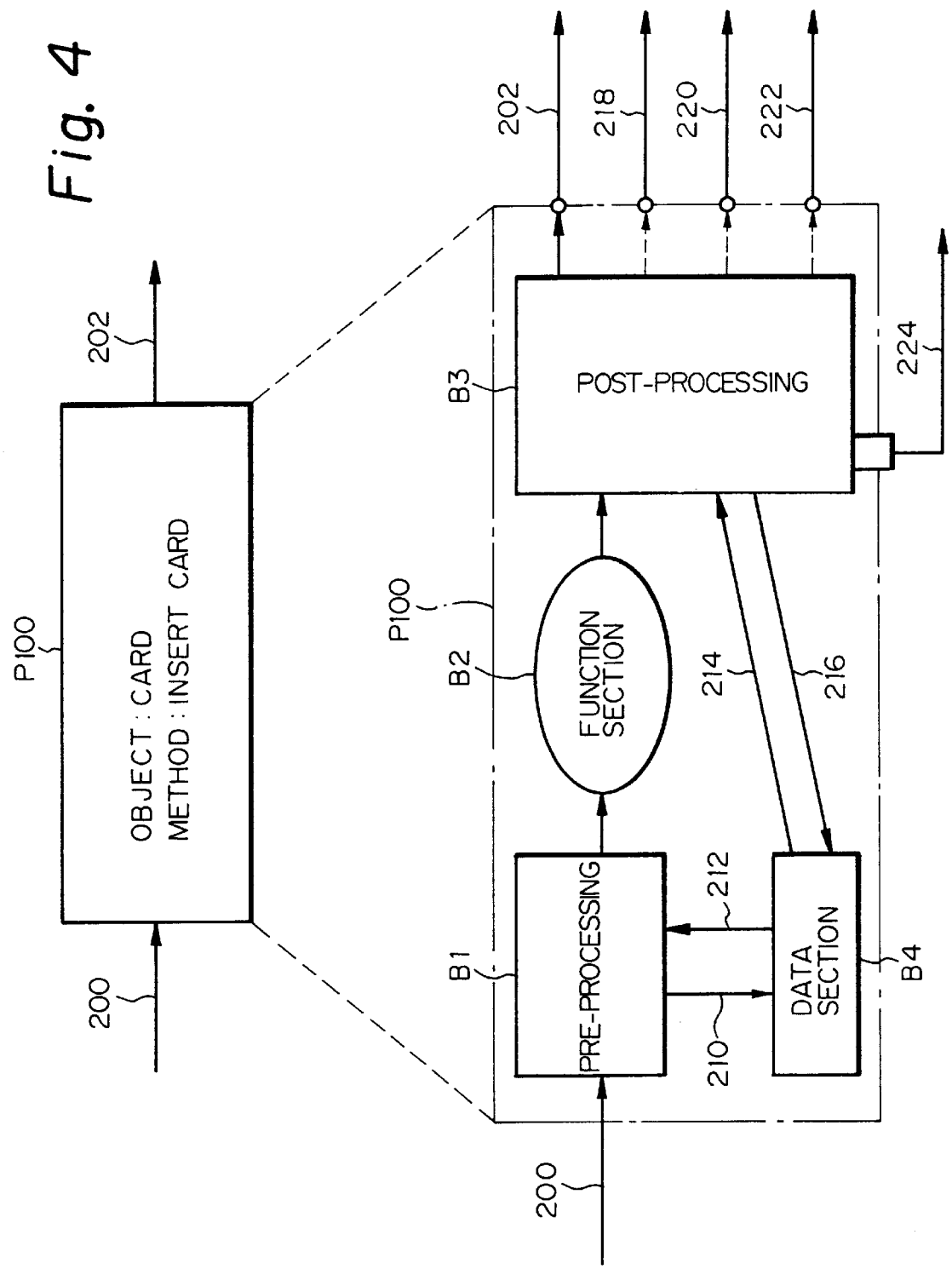

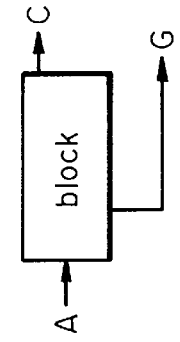
Fig. 5A
Fig. 5B
Fig. 5C
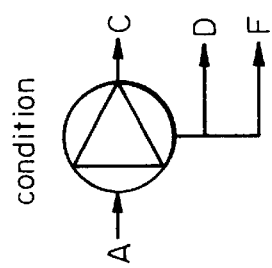
Fig. 5D
Fig. 5E
Fig. 5F
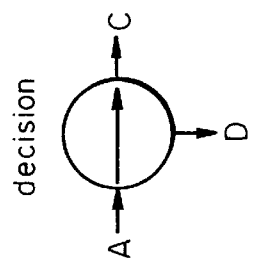
Fig. 5G
Fig. 5H
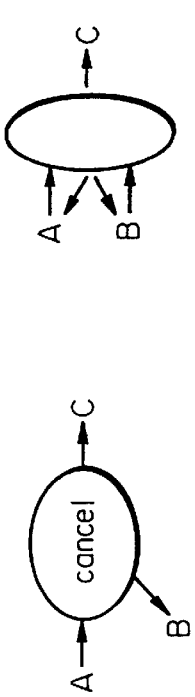

OBJECT-ORIENTED VISUAL PROGRAM DEVELOPMENT SYSTEM FOR HANDLING PROGRAM ENTITY INCLUDING PRE-PROCESSING FUNCTION AND POST-PROCESSING SECTIONS

BACKGROUND OF THE INVENTION

1. Field of the Invention

The present invention relates to a tool for developing programs executed in a parallel, real time processor, and particularly to an object-oriented visual program development system for handling program entity, including pre-processing, function and post-processing sections for developing program sequences using graphical user interface (GUI) on an object-oriented basis, and to a method thereof.

2. Description of the Background Art

Here, the term "parallel, real time processing" refers to a process that handles a plurality of events in parallel to achieve one objective. A typical example of this is an automatic teller machine (ATM) of a financial institution that carries out deposits and withdrawals by performing in parallel such processes as communications with a host computer, reading of magnetic stripes on a card and a passbook, and printing in the passbook or on a receipt.

Although a common type ATM installed in a financial institution such as a bank reads either a cash card or a passbook, a new type of machine can read both of them in parallel. Although the former does not carry out parallel, real time processing, the latter does.

In developing application program sequences without requiring parallel, real time processings, a visual programming development environment has been conventionally provided using an object-oriented scheme that can be loaded into a personal computer or workstation. The visual programming development environment refers herein to an environment for developing program sequences using graphics such as a GUI (Graphical User Interface). As presently-available visual programming development environment, there are "Visual Basic" (trade name) and "Visual C++" (trade name) developed by Microsoft Corporation.

In developing programs for parallel, real time processors, however, it has been considered to be difficult to implement the visual programming development environment based on the object-oriented scheme because of difficulty of modeling the coordination between objects that execute the parallel processes. Here, an "object" in the object-oriented programming refers to a combination of a data item (such as variables, characters, numbers, and the like, which are also called property) with procedures (also called methods, a set of commands that can be executed on the object) associated with the data item.

Accordingly, in developing programs for parallel, real time processors, a conventional program development scheme has been generally employed in which manual coding using a programming language such as C language or PL/1 is required in its final stage. Thus, the coding using the existing programming language is common in developing application program sequences for the parallel, real time processors. This, however, does not always lead to high quality programs though it requires a large amount of effort and time.

SUMMARY OF THE INVENTION

It is therefore an object of the present invention to provide an object-oriented, visual program development system for handling program entities including pre-processing, function and post-processing sections suitable for developing application program sequences for parallel, real time processors, and a method thereof.

Specifically, in the object-oriented, visual program development system in accordance with the present invention for developing program sequences using graphical user interface on the object-oriented basis, each program entity, which is symbolized by an icon used in generating a diagram, has the following structural components:

(1) a pre-processing section coded in a programming language for performing a first operation such as determining parameters of a message sent to the object associated with the program entity;

(2) a function section for storing information indicating a method or procedure in the object in an object library; and (3) a post-processing section coded in a programming language for performing a second operation such as interpreting a message sent back from the object.

In an aspect of the present invention, a parallel, real time processor comprises: an object library including objects; a diagram storage for storing a program obtained from a diagram composed of a combination of icons, each of which symbolizing a program entity which includes a pre-processing section coded in a programming language for performing a first operation, a function section for storing information about a linkage between the program entity and a procedure in one of the objects in the object library, and a post-processing section coded in a programming language for performing a second operation; an icon storage for storing program entities associated with the icons used in generating the diagram; and an interpreter for interpreting the program stored in the diagram storage using the program entities associated with the icons stored in the icon storage, whereby the parallel, real time processor interprets the program with the interpreter when executing the program, and executes the program by making correspondence of each program entity to the procedure in the object in the object library.

In another aspect of the present invention, an automatic transaction machine comprises: an object library including card objects and passbook objects; a diagram storage for storing a program obtained from a diagram composed of a combination of icons, each of which symbolizing a program entity which includes a pre-processing section coded in a programming language for performing a first operation, a function section for storing information about a linkage between the program entity and a procedure in one of objects in the object library including the card objects and the passbook objects, and a post-processing section coded in a programming language for performing a second operation; an icon storage for storing program entities associated with the icons used in generating the diagram; and an interpreter for interpreting the program stored in the diagram storage using the program entities associated with the icons stored in the icon storage, whereby the automatic transaction machine interprets the program with the interpreter when executing the program, and executes the program by making correspondence of each program entity to the procedures in the card object and the passbook object in the object library.

Thus structuring the program entities symbolized by icons and allowing coding of the pre-processing and post-processing sections during generation of the diagram, makes it possible to facilitate the system modeling based on the object-oriented scheme, serving to improve reusability of the objects.

BRIEF DESCRIPTION OF THE DRAWINGS

The objects and features of the present invention will become more apparent from consideration of the following detailed description taken in conjunction with the accompanying drawings in which:

FIG. 4 is a schematic diagram illustrating the internal structure of a program entity symbolized by an icon, which is one of the characteristics of the embodiment;

FIGS. 5A–5H show examples of icons with special functions, which differ from block icons applied in generating the diagram of the embodiment;

DESCRIPTION OF THE PREFERRED EMBODIMENTS

Figure 1:
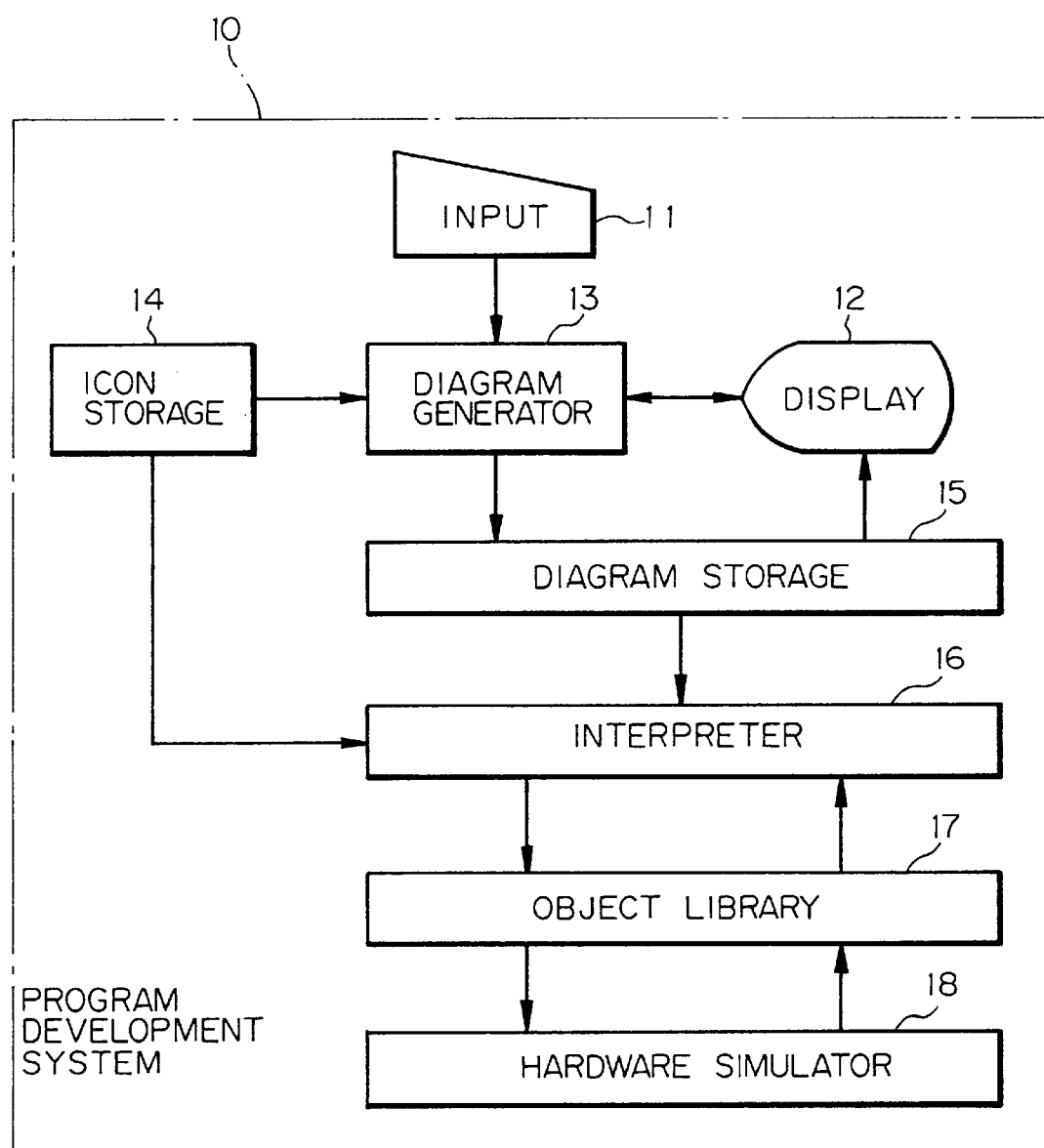
FIG. 1 is a schematic block diagram showing a functional configuration of an embodiment of an object-oriented visual program development system for a parallel, real time processor in accordance with the present invention.

Referring to FIG. 1, showing a functional configuration of an embodiment of an object-oriented visual program development system 10 for a parallel, real time processor in accordance with the present invention, the program development system 10 for developing programs using graphical user interface (GUI) on the object-oriented basis generally comprises an input device 11, a display unit 12, a diagram generator 13, an icon storage 14, a diagram storage 15, an interpreter 16, an object library 17 and a hardware simulator 18.

More specifically, the input device 11 is adapted to select icons for generating a diagram. The display unit 12 displays a diagram during and after its generation. The diagram generator 13 generates the diagram. The icon storage 14 is adapted to store the program entities symbolized by the icons used in generating the diagram. The diagram storage 15 stores the diagram generated by the diagram generator 13. The interpreter 16 interprets and executes the diagram generated by the diagram generator 13, and the object library 17 includes a plurality of objects.

The hardware simulator 18 is adapted to simulate the hardware with which parallel, real time processor is equipped. More specifically, the hardware simulator 18 includes software, or program sequences, adapted for simulating the operation of the parallel, real time processor to verify the functions of the program developed by the program development system 10 without using the parallel, real time processor.

In the FIG. 1 system, it is possible for a computer program sequence to implement the processing such as generating a diagram, storing icons, storing the diagram, interpretation, storing objects, and hardware simulation, and controlling them to generate a target program sequence. It is preferable to store the computer program sequence in a computer-readable main memory or an auxiliary storage. For example, it can be recorded on an auxiliary memory, such as a ROM, flash memory, involatile RAM, magnetic disk, optical disk, IC memory card, magnetic tape.

Figure 2:
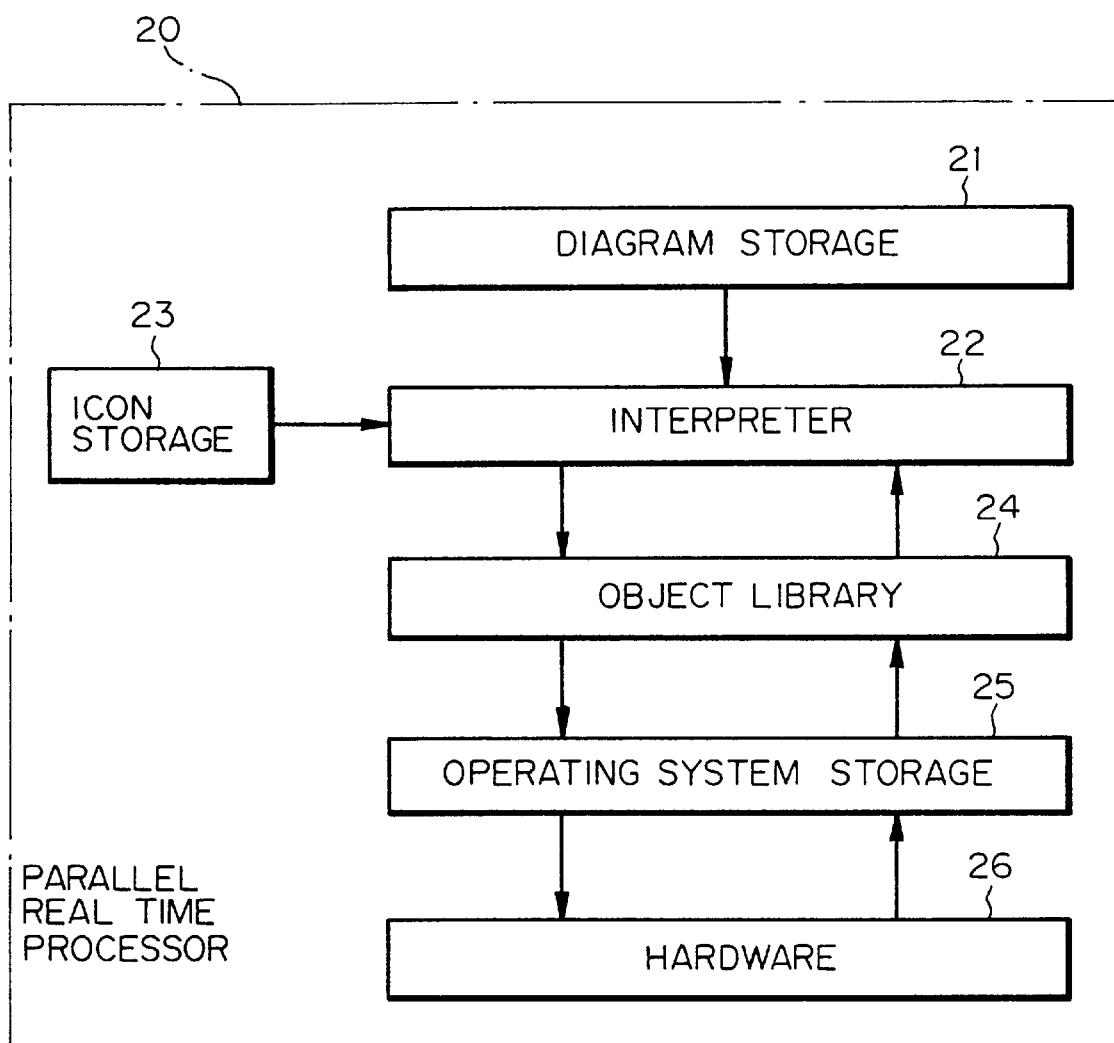
FIG. 2 is a schematic block diagram showing a functional configuration of the parallel, real time processor capable of executing a program developed by the object-oriented, visual program development system shown in FIG. 1.

Now referring to FIG. 2, which schematically shows the functional configuration of the parallel, real time processor 20 capable of executing the program developed by the program development system 10 shown in FIG. 1, the parallel, real time processor 20 comprises a diagram storage 21 for storing the program developed by the program development system 10, an interpreter 22 for interpreting and executing the diagram stored in the diagram storage 21, an icon storage 23 for storing program entities symbolized by icons used in generating the diagram, an object library 24 storing objects, an operating system storage 25 for storing an operating system, and hardware 26. The hardware 26, which is directed to a processing system, includes a CPU, a main memory, an auxiliary storage, an input device, a display unit, and the like.

In a specific application where the parallel, real time processor 20 is applied to an ATM for a financial institution, the hardware 26 includes a customer display, a card reader/writer, a passbook/receipt printer, peripheral devices controlled by the CPU such as a communication control unit for controlling communications with a host computer, and the like.

In the system shown in FIG. 2 also, it is possible for a computer program sequence to implement the processing such as storing a diagram, storing the icons, interpretation, storing objects and storing the operating system. It is preferable to store the computer program sequence in a computer-readable main memory or auxiliary storage. For example, it can be recorded on a ROM, flash memory, involatile RAM, magnetic disk, optical disk, IC memory card, magnetic tape, or the like.

Figure 3:
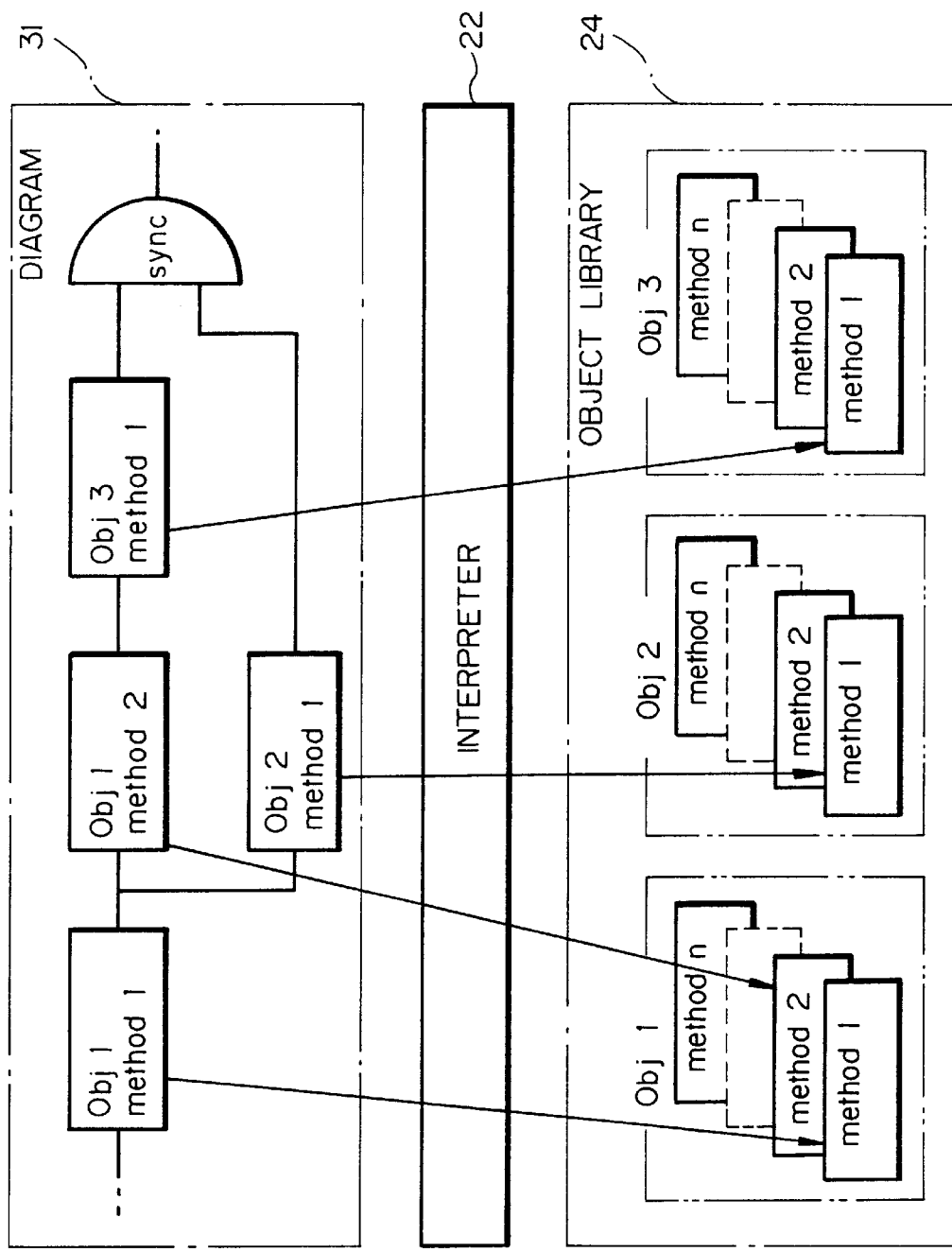
FIG. 3 is a schematic diagram illustrating relationships of a diagram with an interpreter and an object library in executing the program, which has been developed by the object-oriented, visual program development system shown in FIG. 1, by the parallel, real time processor shown in FIG. 2.

Now, FIG. 3 diagrammatically illustrates relationships of a diagram 31 with the interpreter 22 and object library 24 when executing the program, which has been developed by the program development system 10 shown in FIG. 1, by the parallel, real time processor 20 shown in FIG. 2. In the system shown in FIG. 3, a block Obj1/method1 is connected to blocks Obj1/method2 and Obj2/method1, the block Obj1/method2 is connected to a block Obj3/method1 which is in turn connected to the synchronous icon sync, and the Obj2/method1 is also connected to the synchronous icon sync. The synchronous icon sync makes a request to the next icon when receiving a request from the blocks Obj3/method1 and Obj2/method1. In FIG. 3, the objects Obj1, Obj2 and Obj3 in the object library 24 each include methods method1-methodn. Thus, the program entities symbolized by the icons in the diagram 31 are linked with the methods method1-methodn in the objects Obj1—Obj3 constituting the object library 24 via the icon storage 23, when they are executed by the parallel, real time processor 20 shown in FIG. 2.

For example, the block Obj1/method1 in the diagram 31 is linked with Obj1/method1 in the object library 24, and the block Obj1/method2 in the diagram 31 is linked with Obj1/method2 in the object library 24. Likewise, the block Obj2/method1 in the diagram 31 is linked with Obj2/method1 in the object library 24, and the block Obj3/method1 in the diagram 31 is linked with Obj3/method1 in the object library 24.

The term "object-oriented, parallel, visual programming environment" in the instant specification refers to the programming environment formed by the diagram generator 13, icon storage 14 or 23, interpreter 16 or 22, and object library 17 or 24.

Now referring to FIG. 4, that illustrates the internal structure of a program entity symbolized by an icon, which is one of the characteristics of the present embodiment, the icon symbolizing the program entity with such a structure is called a "block icon" from now on to distinguish it from an icon used for special purposes as will be described later. The program entity symbolized by the block icon P100 is stored in the icon storage 14 and icon storage 23.

The program entity symbolized by the block icon P100 includes a pre-processing section B1, a function section B2, a post-processing section B3 and a data section B4. The pre-processing section B1 determines, in response to an external request 200, parameters in a message issued to the method of the object linked to the function section B2. The function section B2 has information about the linkage connecting the block icon with the method in the object constituting the object library. The post-processing section B3 analyzes, in response to the message sent back from the method, the result of executing the method linked with the function section B2, and sets the analyzed result 202 at the interface with the interpreter 16 or 22. The data section B4 stores local variables and constants in the program entity symbolized by the block icon.

Furthermore, the pre-processing section B1 has the data section B4 carry out data update 210. The data section B4 makes references 212 and 214 to the pre-processing section B1 and post-processing section B3, respectively, and the post-processing section B3 performs an update 216 of the data section B4. The post-processing section B3 can also output a success 218, error 220, cancellation 222 and caution 224 as a result of the analysis.

Thus, forming the structure of the program entity symbolized by the block icon P100 in conjunction with making the coding of the processes to be executed in the pre-processing section B1 and post-processing section B3 possible during the generation of the diagram, as will be described later, can eliminate the need for carrying out, in the individual objects provided by the object libraries 17 and 24, processing associated with various events having occurred in the parallel processing executed in the parallel, real time processor 20. This facilitates the system modeling using the object-oriented scheme, thus helping improvement of the reusability of the objects.

Next, another type of icons having special functions and used for generating the diagram will be described with reference to FIGS. 5A–5H. These icons are used to represent on the diagram a control structure in a common program sequence or a control structure unique to the parallel, real time processings, and differ from the block icons in that they have nothing to do with the objects in the object library.

FIG. 5A illustrates a start icon representing the start of a program, and FIG. 5B illustrates an end icon for terminating the program sequence when receiving a request from an icon C. FIG. 5C illustrates a block icon which has been described above in connection with FIG. 4, and the description thereof will be omitted here. FIG. 5D illustrates a synchronous icon which makes a request to the icon C only when it receives requests from a plurality of icons such as icons A and B while it awaits them.

FIG. 5E illustrates a decision icon which makes a decision in response to a request from the icon A, and makes a request to the icon C when the result of the decision is true, whereas to the icon D when it is false. FIG. 5F illustrates a condition icon which makes a decision in response to the request from the icon A and makes a request to a plurality of icons (such as icons C, D and F, for example) in response to the result of the decision.

FIG. 5G illustrates a cancel icon which terminates the operation of the icon B and makes a request to the icon C, at an instant when it receives a request from the icon A. FIG. 5H illustrates a critical region icon which terminates, in response to a previous request from among a plurality of icons (two icons A and B, for example), the operation of the icons other than the icon that has issued the previous request, and makes a request to the icon C.

Figure 6A:
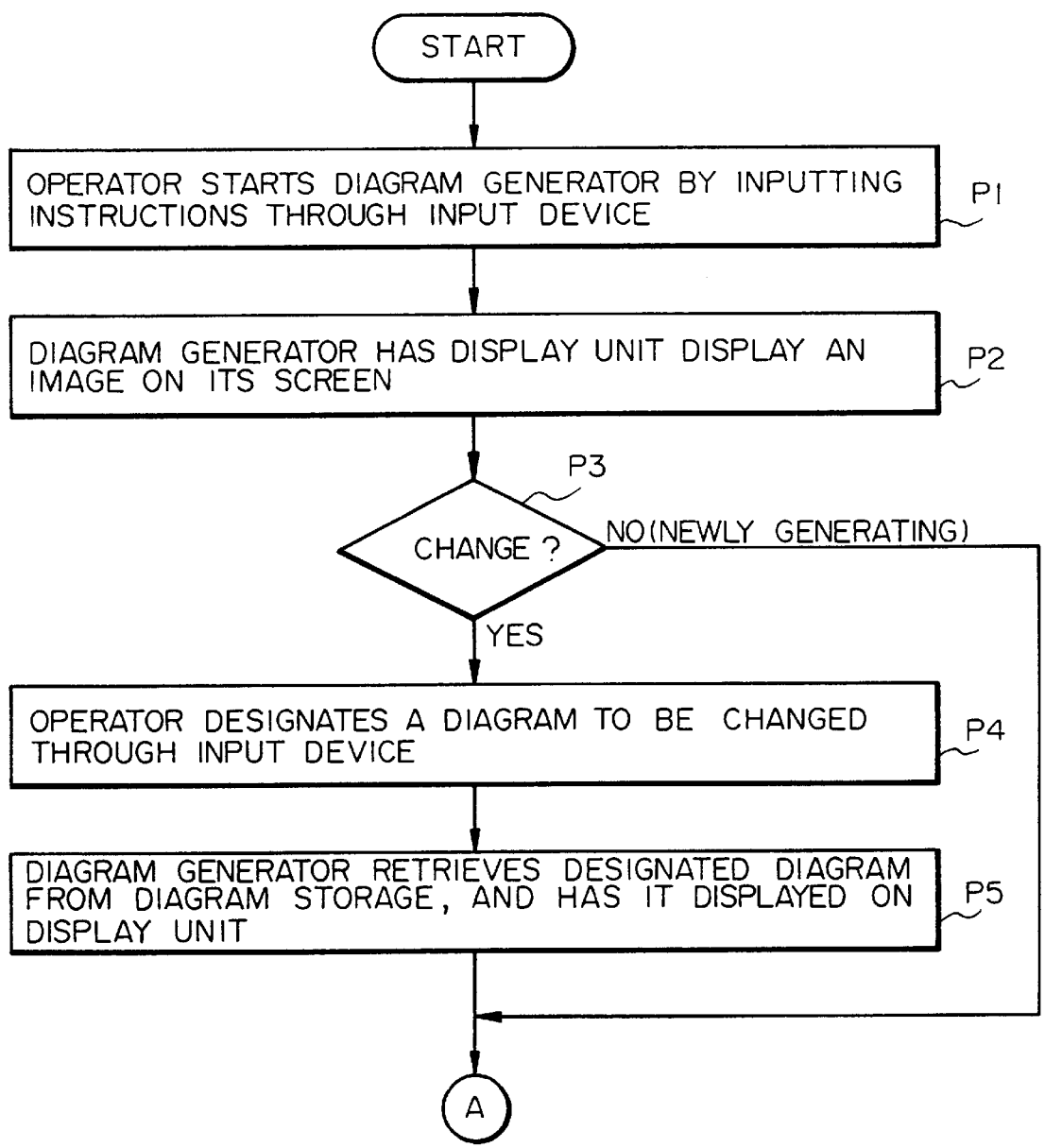
FIGS. 6A and 6B are a flowchart useful for understanding how the diagram is generated in the embodiment.
Figure 6B:
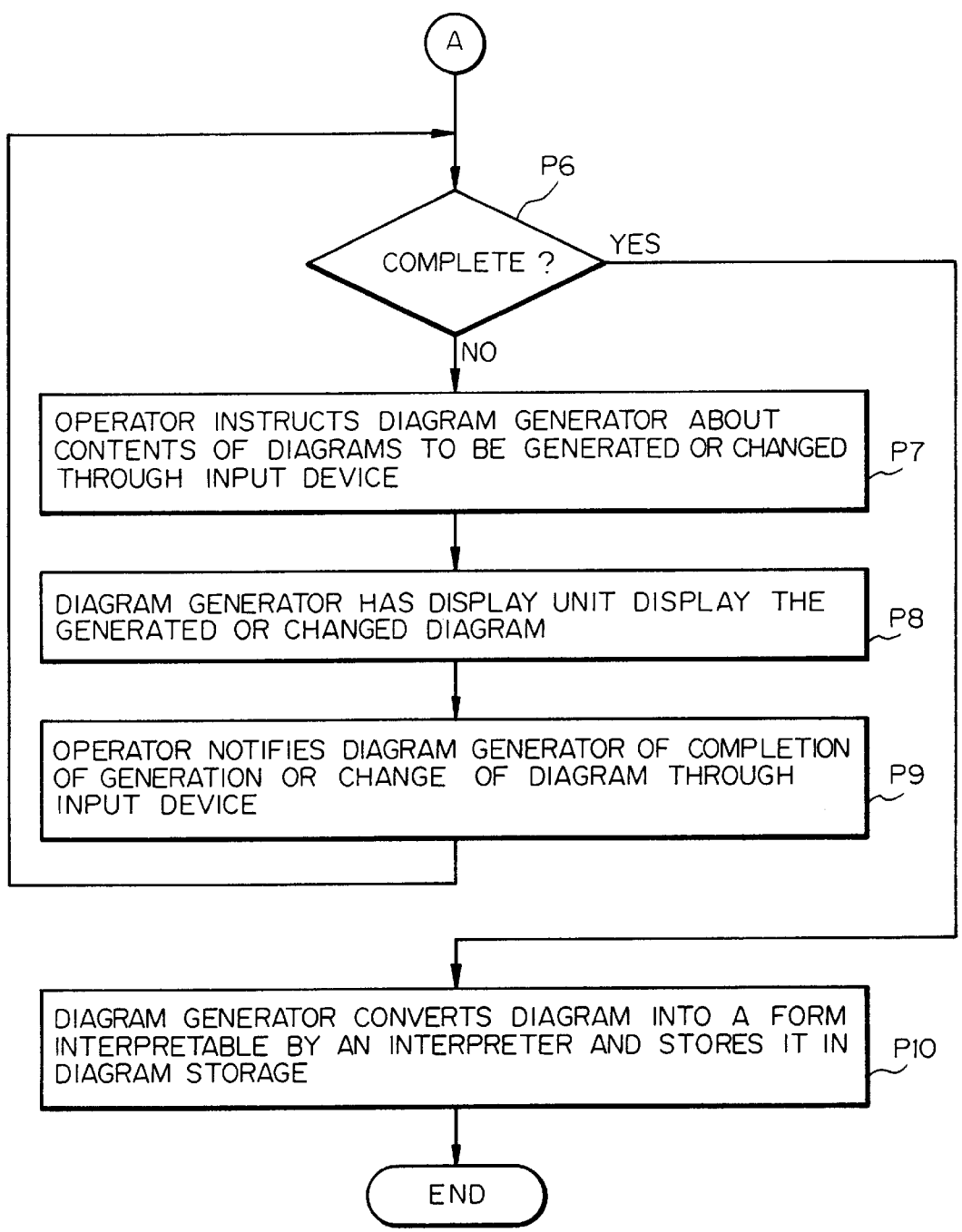

Next, FIGS. 6A and 6B show a flow adapted for generating a diagram carried out by running the computer program sequence. FIGS. 6A and 6B are connected by the connection letter A. The developing method of a program sequence for the parallel, real time processor in the present embodiment will now be described with reference to FIG. 6A together with FIG. 1. First, when an operator starts the diagram generator 13 by inputting instructions through the input device 11 at step P1, the diagram generator 13 has the display unit 12 display an image for generating the diagram at step P2. Then, the operator instructs whether to generate or change the diagram through the input device 11 at step P3. When the change in the diagram is instructed at step P4, the diagram generator 13 fetches the diagram from the diagram storage 15, and has the display unit 12 display it at step P5.

Figure 7:
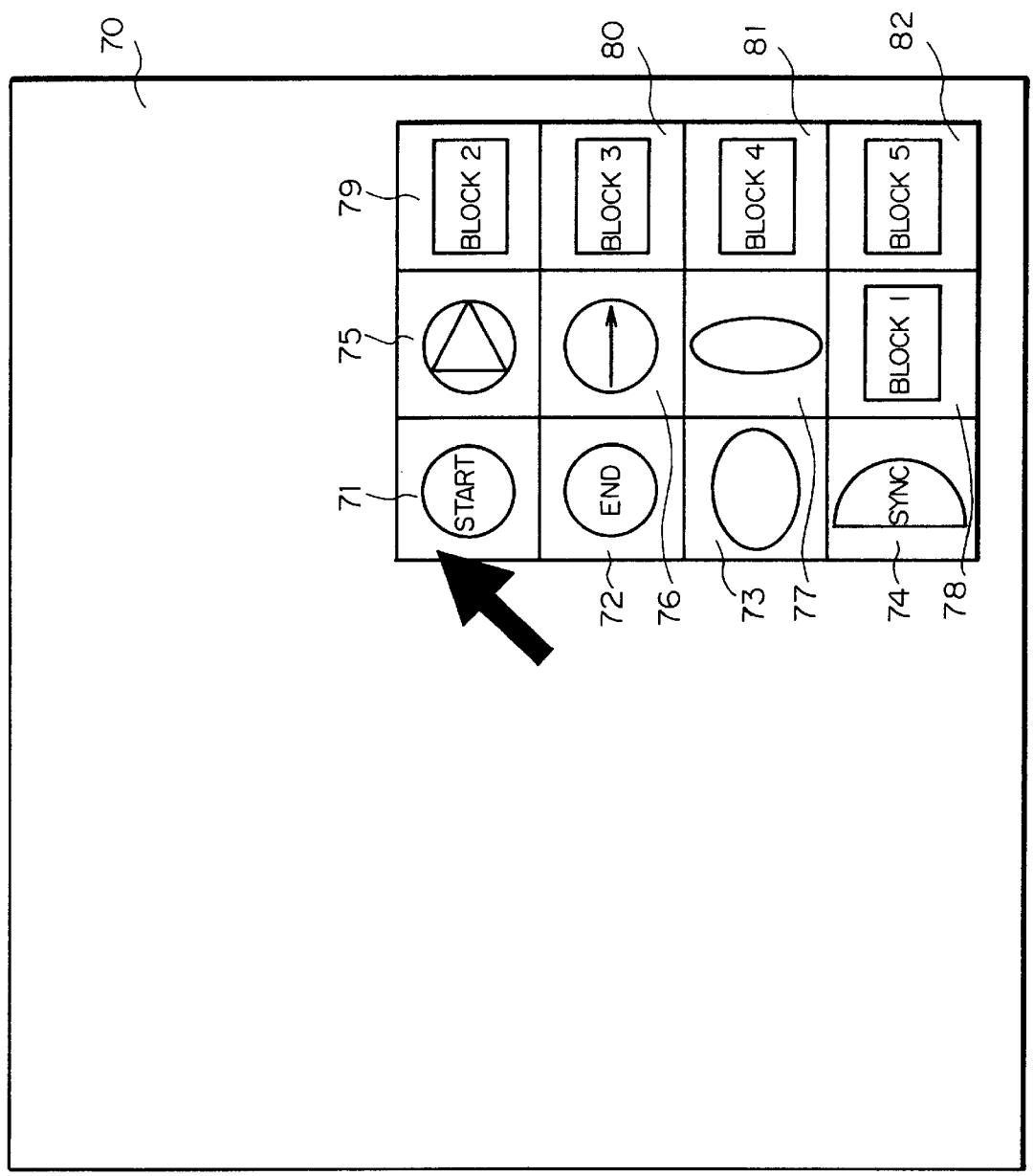
FIG. 7 is a diagram illustrating an example of a diagram generating image displayed on a display screen of the embodiment.

FIG. 7 illustrates the diagram generating image on the display unit 12 in the present embodiment. A set of icons is displayed on its screen 70, which set includes the start icon 71, end icon 72, cancel icon 73, synchronous icon (sync) 74, condition icon 75, decision icon 76, critical region icon 77, block-1 icon 78, block-2 icon 79, block-3 icon 80, block-4 icon 81 and block-5 icon 82.

Afterward, the operator carries out the generation or modification of the diagram in the same way as in the conventional visual programming method without involving the parallel, real time processing at steps P6–P9, FIG. 6B. More specifically, making a decision at step P6 whether the job up to the foregoing step P5, FIG. 6A, has been completed, the operator instructs the diagram generator 13 to generate or change the diagram at step P7 by inputting instructions through the input device 11. Thus, the diagram generator 13 has the display unit 12 display the generated or changed diagram at step P8.

Subsequently, when completing the generation or change of the diagram, the operator instructs the diagram generator 13 at step P9 that the job has been completed by inputting instructions on the input device 11. Then, returning to step P6 again to confirm the completion of the job, the diagram generator 13 converts the diagram into a form interpretable by the interpreter 16 after confirming the completion of the job, and stores it in the diagram storage 15 at step P10, thus ending the diagram generation.

Figure 8:
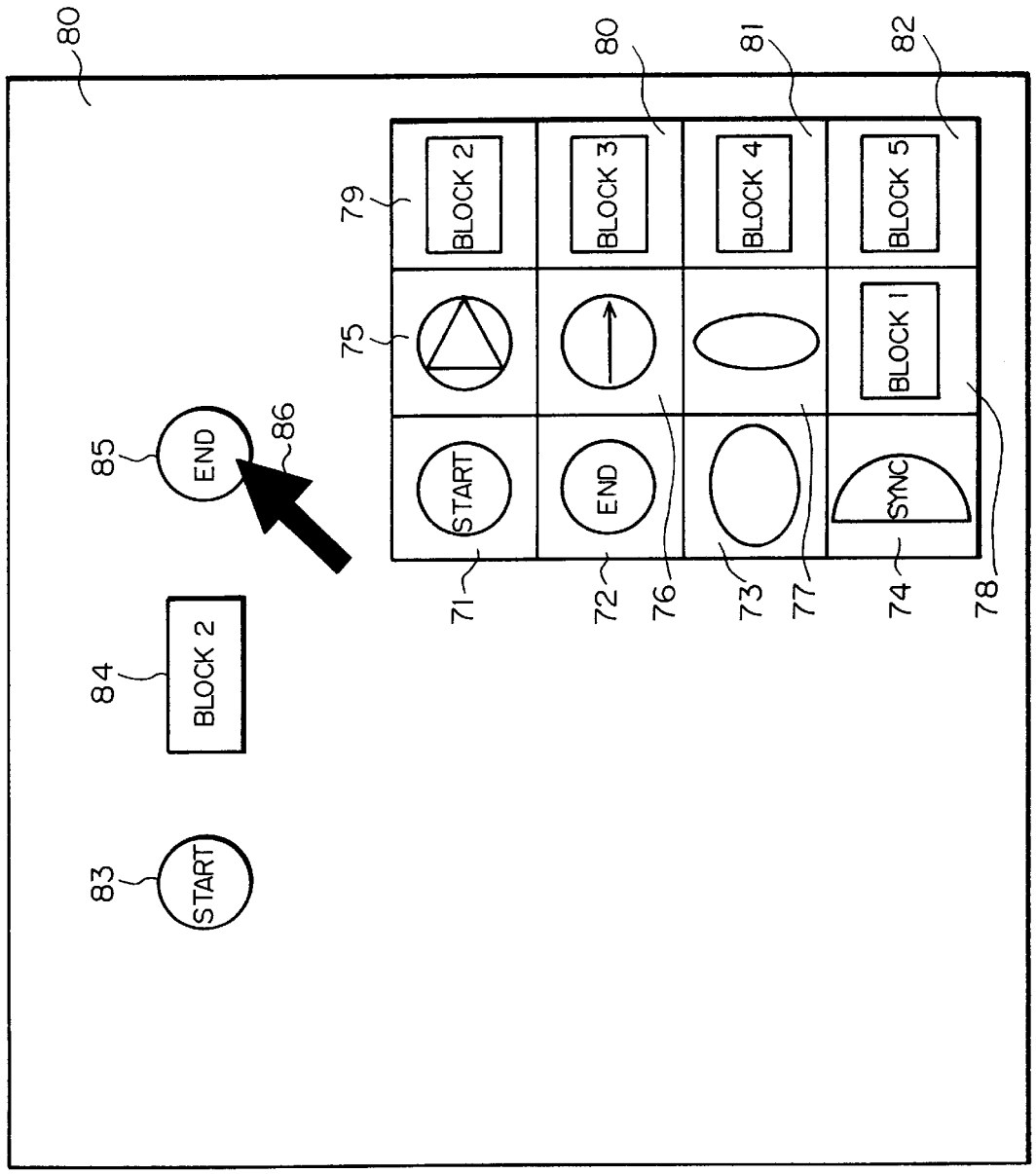
FIG. 8 illustrates placing of an icon on the diagram generating image.
Figure 9:
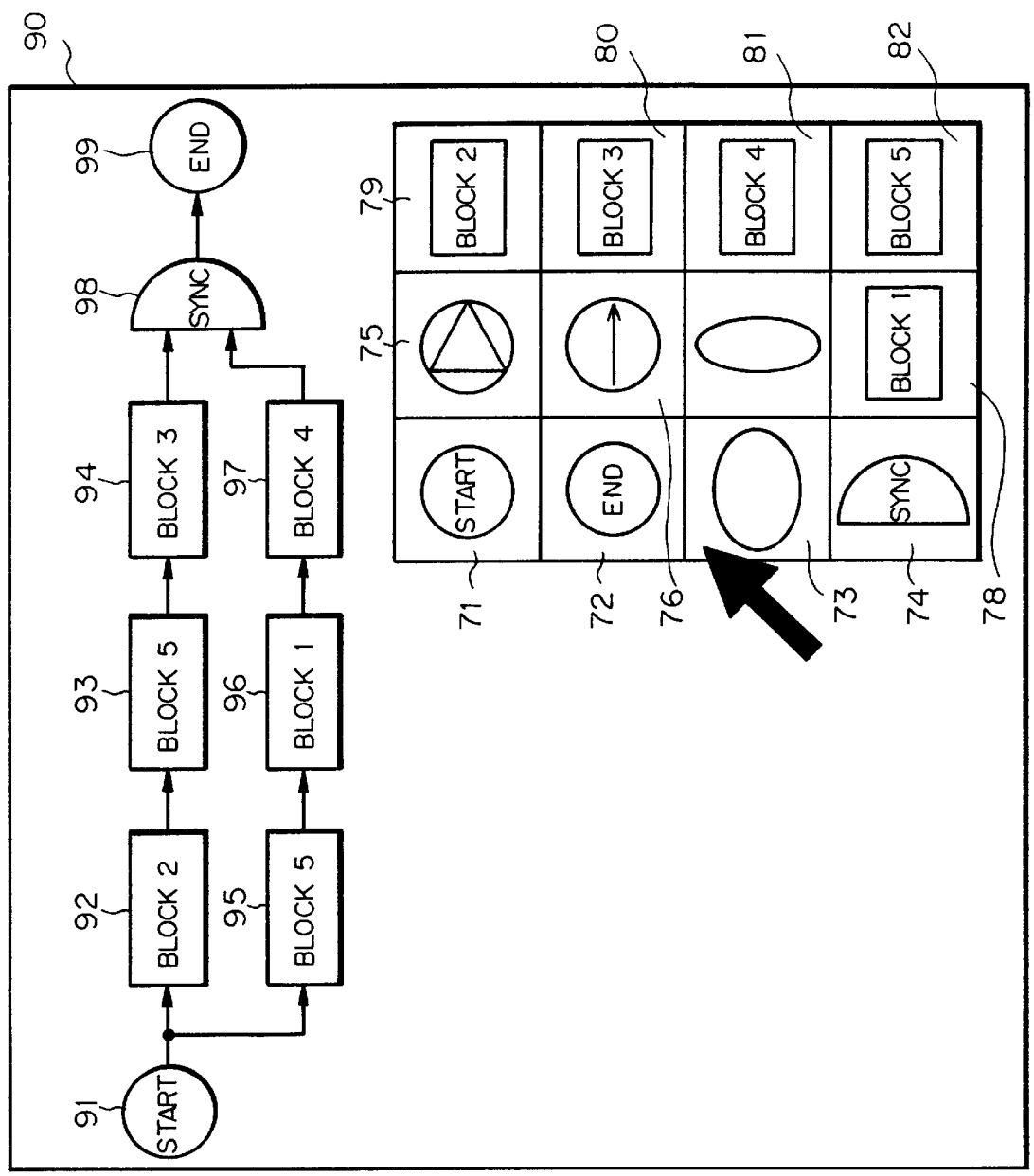
FIG. 9 illustrates the generation of the diagram by placing icons and connecting them on the diagram generating image.

Specifically, the operator works with the diagram by selecting the icons with the input device 11 such as a mouse or the like pointing device as shown in FIGS. 8 and 9, places the selected icons on desired positions on the diagram generation image, and connects these icons, thereby generating or changing the diagram. FIG. 8 illustrates a screen 90 displaying a start icon 83, block-2 icon 84 and end icon 85, which are selected with the mouse and put in positions by moving a cursor 86, besides the start icon 71, end icon 72, cancel icon 73, synchronous icon (sync) 74, condition icon 75, decision icon 76, critical region icon 77, block-1 icon 78, block-2 icon 79, block-3 icon 80, block-4 icon 81 and block-5 icon 82.

FIG. 9 illustrates the screen 90 displaying, besides the above icons, start icon 91, block-1 icon 96, block-2 icon 92, block-3 icon 94, block-4 icon 97, block-5 icons 93 and 95, synchronous icon 98, and end icon 99, which are selected with the mouse, and interconnected after moved and put in positions with a cursor 86.

As shown in FIG. 9, the start icon 91 is connected with the block-2 icon 92 and block-5 icon 95, the block-2 icon 92 is connected with the block-5 icon 93, the block-5 icon 93 is connected with the block-3 icon 94, the block-3 icon 94 is connected with the synchronous icon 98, the block-5 icon 95 is connected with the block-1 icon 96, the block-1 icon 96 is connected with the block-4 icon 97, the block-4 icon 97 is connected with the synchronous icon 98, and the output of the synchronous icon 98 is connected with the end icon 99.

Figure 10:
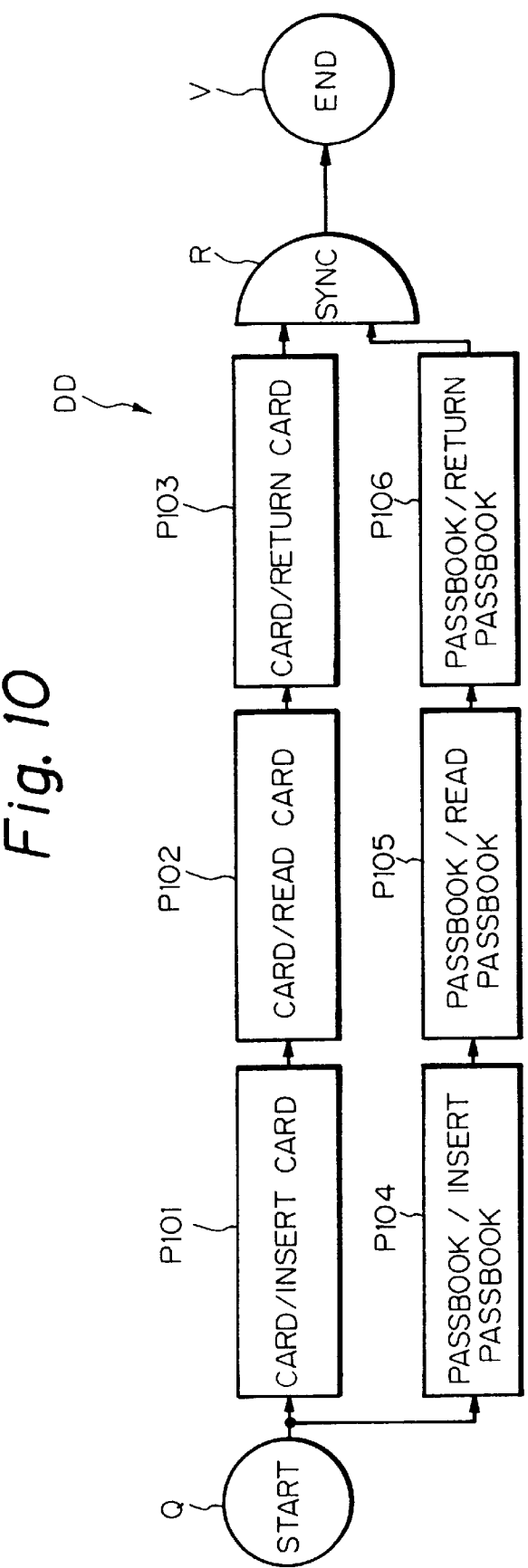
FIG. 10 is a schematic block diagram showing an example of the diagram generated by the method illustrated in FIGS. 7, 8 and 9.

FIG. 10 shows an example of the diagram generated by the computer program processing in accordance with the method illustrated in FIGS. 7, 8 and 9. In FIG. 10, the diagram DD represents, in an ATM installed in a financial institution such as a bank, the operation of an application program for executing the processing in parallel beginning from reading a card and a passbook inserted to the ATM and ending by returning them to a customer.

The diagram DD is a combination of a start icon Q, block icons P101–P106, synchronous icon R and end icon V. More specifically, the start icon Q is connected with the block icons P101 and P104, the block icon P101 is connected with the block icon P102, the block icon P102 is connected with the block icon P103, and the block icon P103 is connected with the synchronous icon R. In parallel with this, the block icon P104 is connected with the block icon P105, the block icon P105 is connected with the block icon P106, and the block icon P106 is connected with the synchronous icon R. Then, the output of the synchronous icon R is connected to the end icon V. Thus, the two series of block icons are processed along the foregoing routes.

Furthermore, the present embodiment makes it possible to carry out, in the foregoing generating or changing process of the diagram, coding of the processings to be executed by the pre-processing section and post-processing section in each program entity symbolized by each one of the icons selected and disposed on the screen. This operation is performed as follows, for example.

Figure 11:
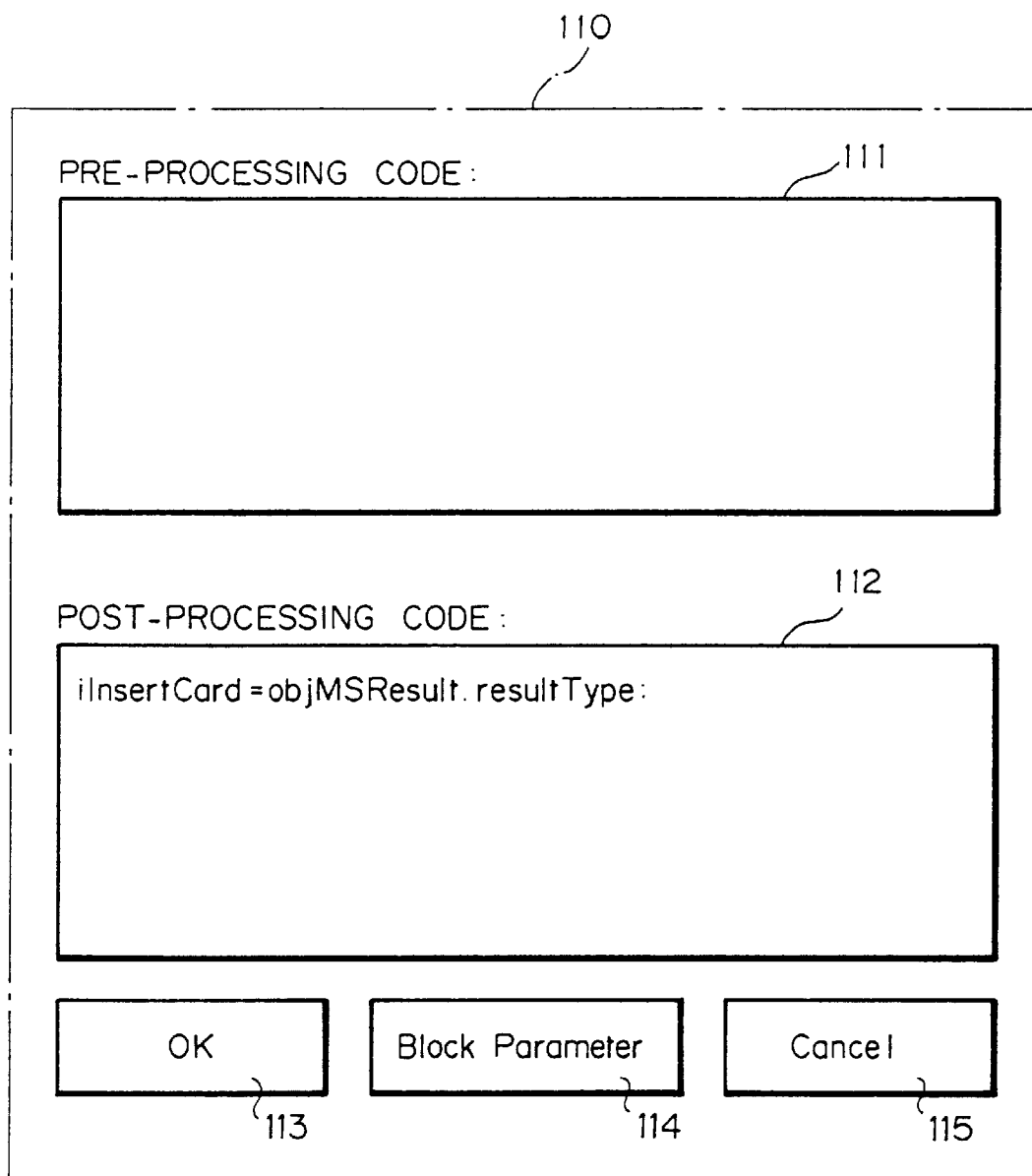
FIG. 11 is a schematic block diagram illustrating coding of the pre-processing section and the post-processing section included in the block icon of the embodiment.

First, by clicking one of the icons selected and disposed on the screen with the mouse, an image 110 associated with the icon is displayed as shown in FIG. 11. The image 110 includes windows 111 and 112 for inputting program codes into the pre-processing section B1 and post-processing section B3, FIG. 4, and an "OK" icon 113, a "Block Parameter" icon 114 and a "Cancel" icon 115, which are provided to be selected.

The program codes can be input into the windows 111 and 112 from the keyboard using an existing programming language such as C language. It is also possible to prepare for the pre-processing section B1 and post-processing section B3 icons corresponding to program entities whose codings have already been prepared.

The window 112 representing the post-process code displays a command code "InsertCard=objMSResult. resultType" input therein. Subsequently, in response to the instructions to complete the operation from the operator, the diagram generator 13, FIG. 1, converts the diagram into a program in the form of an intermediate language interpretable by the interpreter 22 in the parallel real time processor 20 shown in FIG. 2, and stores the diagram plus the program in the form of the intermediate language into the diagram storage 21 (see, step P10 of FIG. 10).

Since the program development system 10 of the present embodiment is provided with the interpreter 16, object library 17 and hardware simulator 18 as shown in FIG. 1, the operation of the diagram on the parallel real time processor 20, which was generated through the program procedure as shown in FIGS. 6A and 6B, can be simulated and verified by the program development system 10.

The object-oriented, visual program development system in accordance with the present invention is not limited to the specific configuration of the foregoing embodiment. For example, the interpreter 16, object library 17 and hardware simulator 18 can be removed from the object-oriented, visual program development system, if the function is unnecessary to simulate and verify the operation of the program sequence developed by the present program development system. In this case, the verification of the program sequence can be achieved by actually running the parallel, real time processor.

In addition, it is possible for the diagram generator 13 in FIG. 1 to generate a program sequence in its execute form by carrying out linkage and editing between the program entities symbolized by the block icons and the objects in the object library 17.

Figure 12:
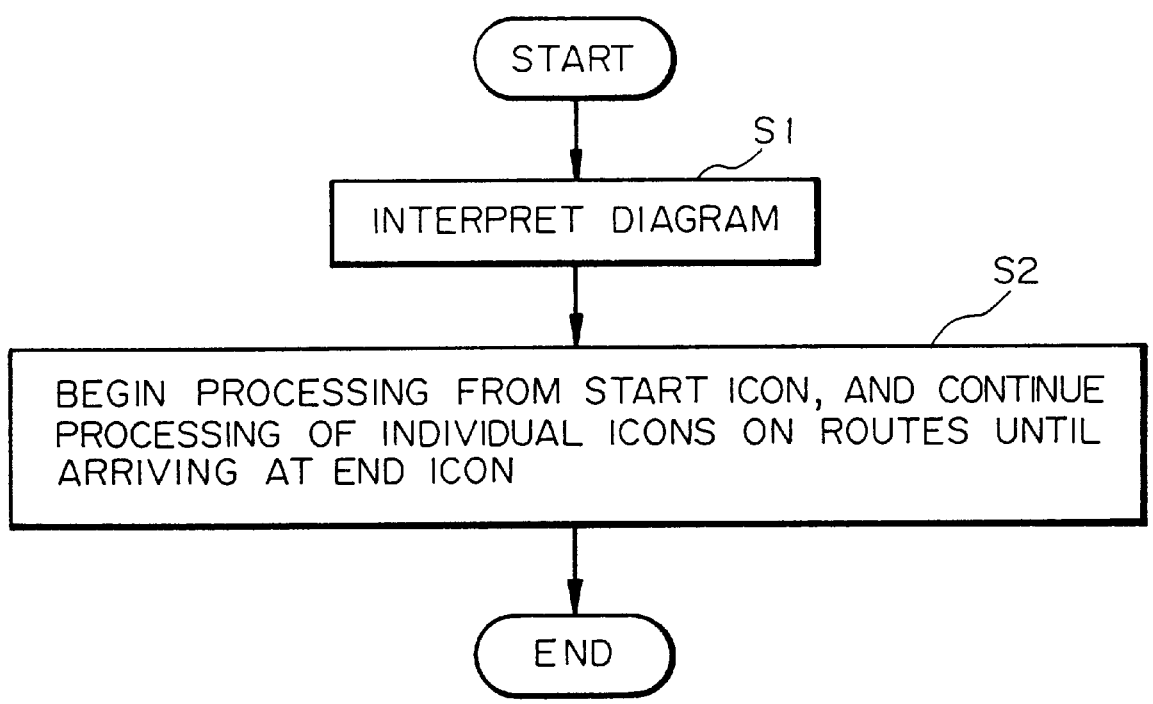
FIG. 12 is a flowchart useful for understanding the operation of a parallel, real time processor executing the diagram generated by the object-oriented, visual program development system.

FIG. 12 is a flowchart illustrating the operation when the diagram generated by the program development system 10 shown in FIG. 1 is executed by running the program sequence in the parallel, real time processor 20 shown in FIG. 2. First, the interpreter 22 interprets the diagram at step S1. Subsequently, the parallel, real time processor 20 processes the respective icons on the routes from the start icon to the end icon at step S2.

More specifically, in the diagram shown in FIG. 10, it starts the operation from the start icon Q, and processes the block icons P101–P103 in parallel with the block icons P104–P106. Subsequently, receiving results from the block icons P103 and P106, the synchronous icon R makes a request to the end icon V, thus completing the processing.

Figure 13:
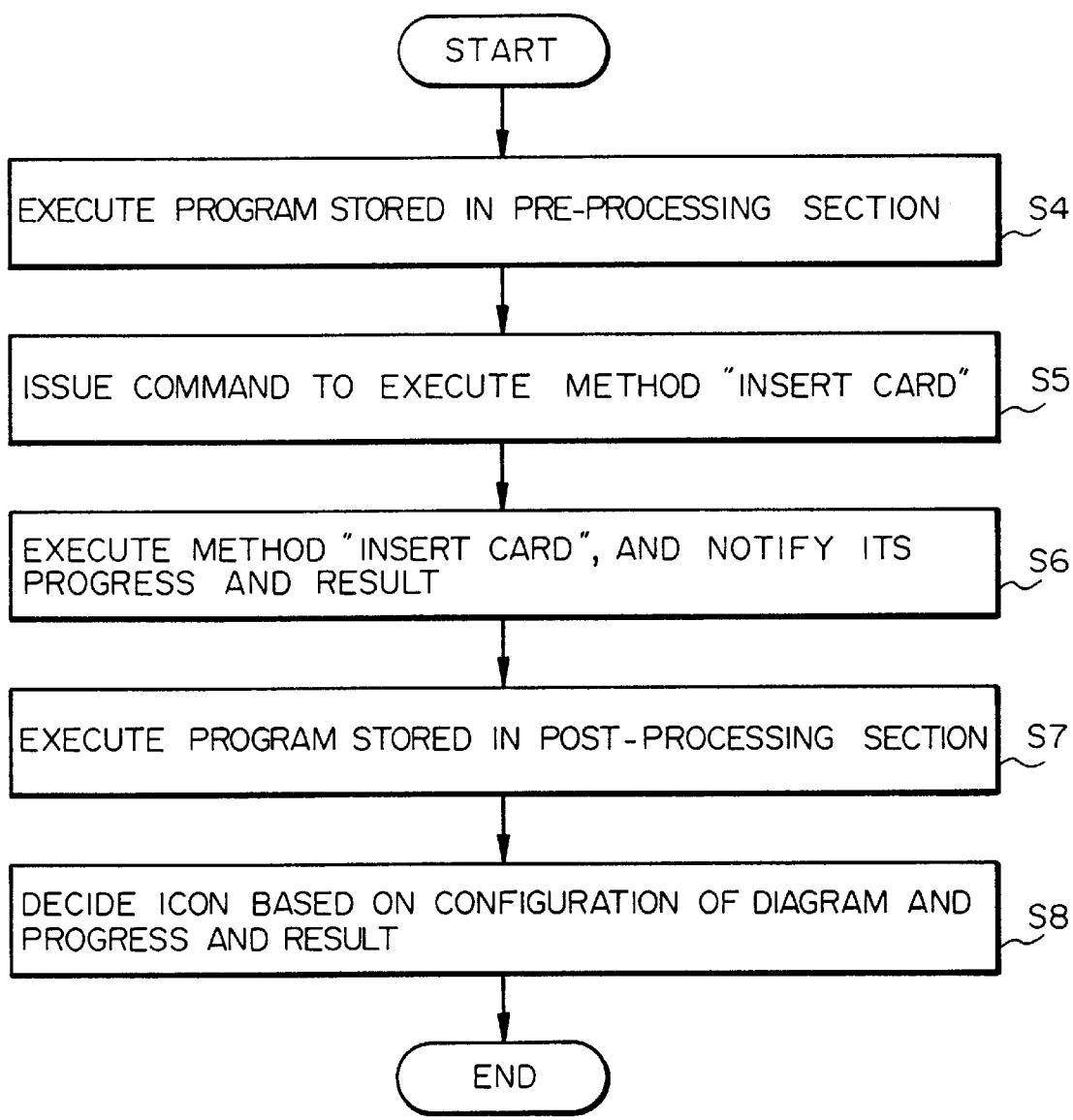
FIG. 13 is a flowchart useful for understanding the operation of processing a block icon associated with "insert card" shown in FIG. 10.

FIG. 13 shows in a flowchart, as an example, the operation when the computer executes the program sequence associated with the "insert card" block icon P101 of FIG. 10. In this case, we assume that the object library 24 in the parallel, real time processor 20 has a structure as shown in FIG. 14.

Figure 14:
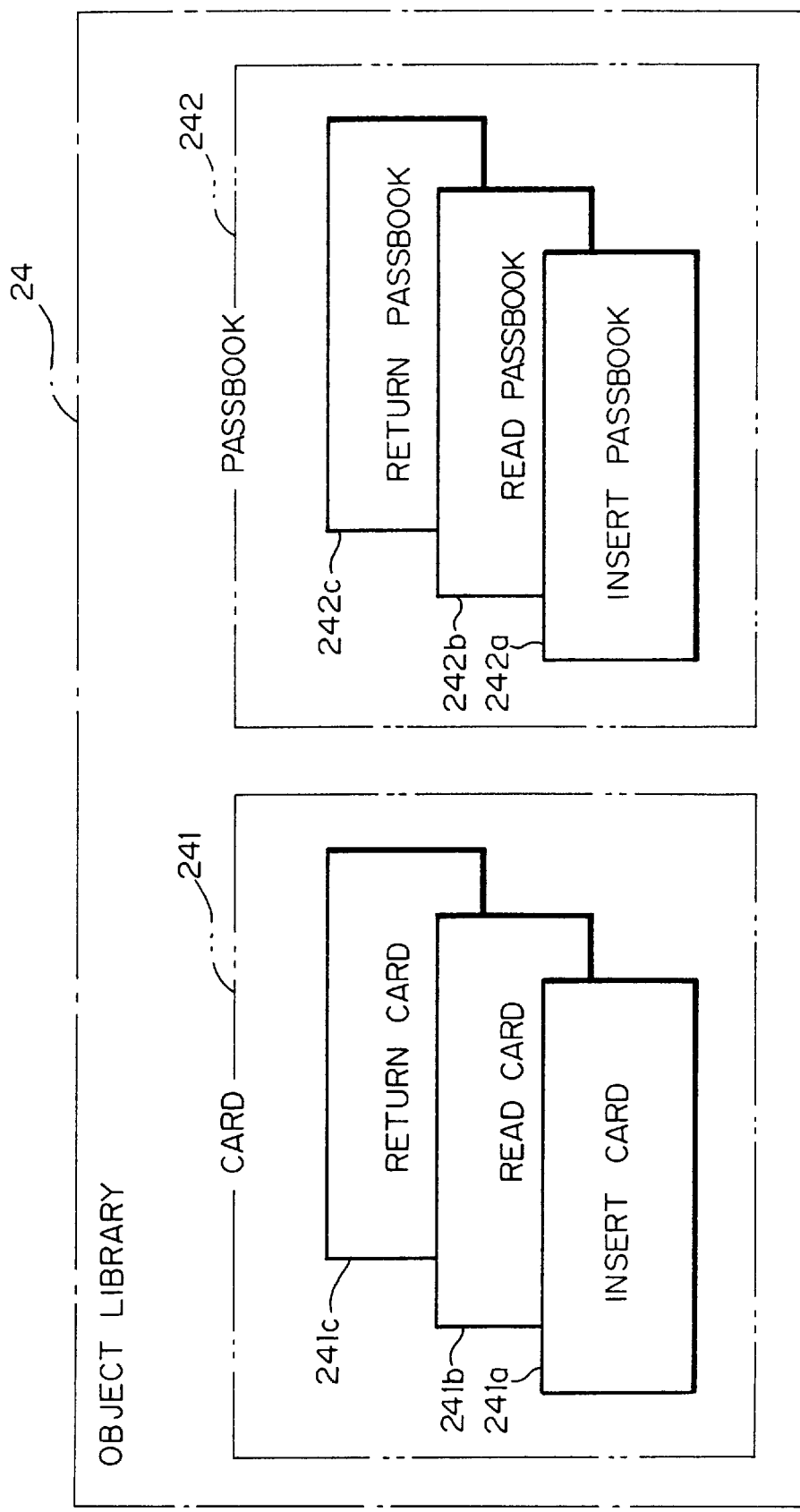
FIG. 14 is a schematic diagram showing an exemplified configuration of an object library.

As can be seen from FIG. 14, the object library 24 includes a card 241 and a passbook 242 as objects. The object "card" 241 includes "insert card" 241a, "read card" 241b and "return card" 241c as methods. The object "passbook" 242 includes "insert passbook" 242a, "read passbook" 242b and "return passbook" 242c as methods.

Figure 15:
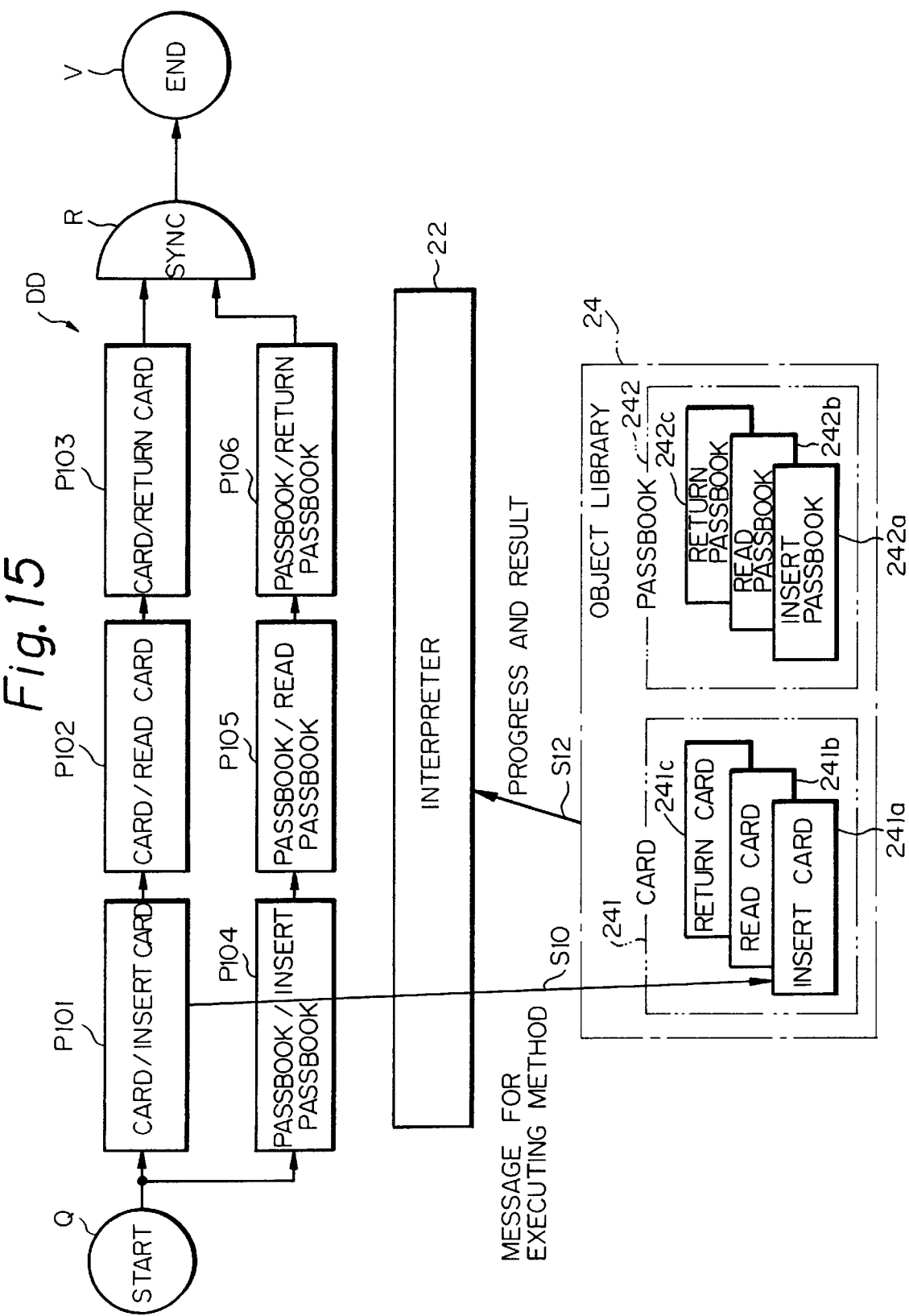
FIG. 15 is a schematic block diagram showing relationships between the interpreter and the object library.

FIG. 15 illustrates relationships between the components of the diagram DD shown in FIG. 10, the interpreter 22 and the object library 24 shown in FIG. 14. The diagram DD, having the same configuration as that shown in FIG. 10, executes in parallel the processing of "insert, read and return card" P101–P103, and the processing of "insert, read and return passbook" P104–P106, and after this processing, it has the synchronous icon R synchronize the processings and notify the end icon V of the completion.

The operation involved in the method "insert card" proceeds as follows. At step S4, FIG. 13, a program sequence stored in the pre-processing section B1 in the block icon P100 shown in FIG. 4 is executed. Subsequently, at step S5, the interpreter 22 sends to the object library 24 a message to execute the method "insert card" 241a in the object "card" 241 as indicated by step S10, FIG. 5, illustrating the relationships between the interpreter 22 and the object library 24. This operation is carried out by referring to the information about the method stored in the function section B2, FIG. 4, in the block icon P100.

Afterward, at step S6, executing the method "insert card" 241a in the object "card" 241, the CPU reports to the interpreter 22 about the progress and result of executing the method "insert card" 241a as indicated by step S12 in FIG. 15. The method is executed by controlling hardware 26, FIG. 2, through the operating system 25 to carry out the operations involved in the method.

Next, at step S7, the program sequence stored in the post-processing section B3, FIG. 4, in the block icon P100, is executed. Subsequently, at step S8, the interpreter 22 shown in FIG. 15 determines the next icon to be executed on the basis of a result of the analysis sent from the object method carried out by then post-processing section B3.

Figure 16:
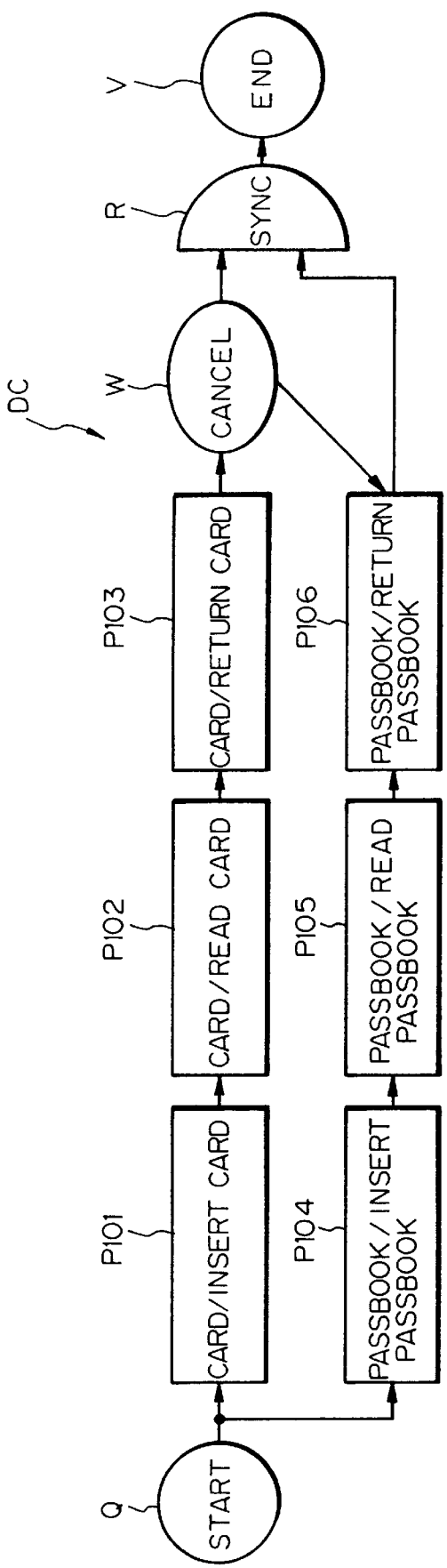
FIG. 16 is a schematic diagram showing the structure of a diagram of an alternative embodiment including a cancel icon.

Referring to FIG. 16, which shows another configuration of the diagram, the diagram DC is the same as the diagram DD shown in FIG. 10 except that it includes a cancel icon W interposed, as depicted before the synchronous icon R with respect to the direction of the control flow.

In the diagram DC, FIG. 16, the operation starts from the start icon Q, and carries out parallel processings of the block icons P101–P103 associated with the "insert card, read card, return card", and of the block icons P104–P106 associated with the "insert passbook, read passbook, return passbook". Receiving the result of the block icon P103 associated with the "card/return card", the cancel icon W cancels the operation of the block icon P106 associated with "passbook/return passbook". Then after synchronizing the results of the two icons, the synchronous icon R makes a request to the end icon V to terminate the processings.

Thus applying the cancel icon W to the parallel processings of a program sequence enables the remainder of the parallel processings to be canceled at the instant when a predetermined one of them has been completed. This makes it possible to shorten the total program processing time as compared with the case that simply awaits the completion of all the parallel processings.

As described above, according to the present invention, the program entities, which are symbolized by the block icons used in the diagram and executed by the computer, each comprise the pre-processing section, the function section and the post-processing section. This makes it possible to implement the program development for the parallel, real time processor based on the object-oriented, visual programming, which has been considered to be difficult by the conventional system. This can reduce an amount of labor of coding which has been carried out using a programming language such as C language or PL/1 in the conventional program development, and improve the quality of the program.

The entire desclosure of Japanese patent application No. 106143/1997 filed on Apr. 23, 1997 including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A method of developing an object-oriented, visual program sequence, comprising the steps of:

preparing program entities symbolized by icons, each of said program entities defining an object included in an object library and a method for the object, each of said program entities comprising:
a function section linking a corresponding one of the icons that symbolizes the program entity with the method for the object in an object library,
a pre-processing section coded in a computer language and defining, in response to a request provided from another of the objects, a parameter in a first message issued for the method of the linked method, and
a post-processing section coded in a computer language, interpreting a second message which has been returned from the method, when executed, and is representative of a result from operation of the method, and notifying a first interpreter of a result from interpretation of the second message to determine one of the objects to successively be processed; and generating a diagram composed of a combination of the icons using a graphical user interface based on an object-oriented programming to develop the program sequence.

2. A parallel, real time processor comprising:

an object library including objects;

a diagram storage for storing a program sequence obtained from a diagram composed of a combination of icons, each of which icons symbolizes a program entity, the combination of icons including at least two associated series of icons, said program entity including
a function section linking a corresponding one of the icons, which symbolizes the program entity, with a method for one of the objects,
a pre-processing section coded in a computer language and defining, in response to a request provided from another of the objects, a parameter in a first message issued for the linked method, and a post-processing section coded in a computer language, interpreting a second message which has been returned from the method, when executed, and is representative of a result from operation of the method, and notifying a first interpreter of a result from interpretation of the second message to determine another of the objects successively to be processed;

an icon storage for storing the program entities symbolized by the icons used in generating the diagram; and a second interpreter for interpreting the program sequence stored in said diagram storage using the program entities stored in said icon storage, said second interpreter interpreting the program sequence, when executed, and executing the program sequence by making correspondence of each of the program entities to a linked one of the methods for one of the objects in said object library.

3. The processor in accordance with claim 2, wherein each of said program entities further comprises a data section for storing internal local variables and/or constants.

4. An automatic transaction machine comprising:

an object library including card and passbook objects;

a diagram storage for storing a program sequence obtained from a diagram composed of a combination of icons, each of which icons symbolizes one of a plurality of program entities, the combination of icons including at least two associated series of icons, each program entity including a function section linking a corresponding one of the icons that symbolizes the program entity with a method for an object, said object being one of the card and passbook objects, a pre-processing section coded in a computer language and defining, in response to a request provided from another of the objects, a parameter in a first message issued for the method of the linked method, and a post-processing section coded in a computer language, interpreting a second message which has been returned from the method, when executed, and is representative of a result from operation of the method, and notifying a first interpreter of a result from interpretation of the second message to determine another of the card and passbook objects to successively be processed;

an icon storage for storing program entities symbolized by the icons used in generating the diagram; and a second interpreter for interpreting the program sequence stored in said diagram storage using the program entities stored in said icon storage, said interpreter interpreting the program sequence, when executed, and executing the program sequence by making correspondence of each of the program entities to one of the methods in the card and passbook objects in said object library.

5. The transaction machine in accordance with claim 4, wherein said card object in said object library comprises a card insertion method, a card read method and a card return method, and said passbook object comprises a passbook insertion method, a passbook read method and a passbook return method.

6. A parallel, real time processing method comprising the steps of:

storing, in a diagram storage, a program sequence obtained from a diagram composed of a combination of icons, the combination of icons including at least two associated series of icons, each of which icons symbolizes one of a plurality of program entities, wherein each program entity includes a function section linking a corresponding one of the icons that symbolizes the program entity with a method for an object included in an object library, a pre-processing section coded in a computer language and defining, in response to a request provided from another of the objects, a parameter in a first message issued for the linked method, and a post-processing section coded in a computer language, interpreting a second message which has been returned from the method, when executed, and is representative of a result from operation of the method, and notifying a first interpreter of a result from interpretation of the second message to determine one of the objects successively to be processed;

storing, in an icon storage, the program entities symbolized by the icon- used in generating the diagram; and interpreting, with a second interpreter, the program sequence stored in the diagram storage using the program entities stored in the icon storage, whereby the program sequence is interpreted with the second interpreter when executed, and executed by making correspondence of each of the program entities to a linked one of the methods for one of the objects in the object library.

7. An automatic transaction method comprising the steps of:

storing, in a diagram storage, a program sequence obtained from a diagram composed of a combination of icons, the combination of icons including at least two associated series of icons, each of the icons symbolizing a program entity that includes a function section linking the icon with a method for an object, said object being one of card and passbook objects included in an object library, a pre-processing section coded in a computer language and performing a first operation in response to a request provided from another of the objects, the first operation defining a parameter in a first message issued for the linked method, and a post-processing section coded in a computer language, performing a second operation interpreting a second message which has been returned from the method, when executed, and is representative of a result from operation of the linked method, and notifying a first interpreter of a result from interpretation of the second message to determine another one of the card and passbook objects successively to be processed;

storing, in an icon storage, the program entities symbolized by the icons used in generating the diagram; and interpreting, with a second interpreter, the program sequence stored in the diagram storage using the program entities stored in the icon storage, whereby the program sequence is interpreted with the second interpreter when executed, and executed by making correspondence of each of the program entities to one of the methods for one of the card and passbook objects in the object library.

8. The method in accordance with claim 7, further comprising the steps of:

executing the first operation defined by the pre-processing section of a card icon;

notifying from the second interpreter to the object library that a card insertion method in the card object is to be executed;

executing the card insertion method in the card object;

notifying the second interpreter of a progress and result of said step of executing the card insertion method;

executing the second operation defined by the post-processing section; and deciding with the second interpreter an icon symbolizing a program entity to be executed next in response to a result of analysis sent from the method for the object associated with the post-processing section to the second interpreter.

9. A computer program product comprising a recording medium having stored thereon computer readable information, the computer readable information including an object-oriented, visual program sequence for developing a program sequence by generating a diagram composed of a combination of icons using a graphical user interface based on object-oriented programming, said program sequence comprising a program entity symbolized by one of the icons and defining an object included in an object library and a method for the object, said program entity comprising:

a function section linking one icon symbolizing the program entity with the method for the object;

a pre-processing section coded in a computer language and defining, in response to a request provided from another of the objects, a parameter in a first message issued for the linked method; and a post-processing section coded in a computer language, interpreting a second message which has been returned from the linked method, when executed, and is representative of a result from operation of the linked method, and notifying an interpreter of a result from interpretation of the second message to determine a next object successively to be processed.

10. A computer readable product, comprising a recording medium storing computer readable information, the computer readable information including a parallel, real time application program for performing the steps of:

storing, in a diagram storage, a program sequence obtained from a diagram composed of a combination of icons, the combination of icons including at least two associated series of icons, each of the icons symbolizing a program entity that includes a function section linking said each icon with a method for an object included in an object library, a pre-processing section coded in a computer language and defining, in response to a request provided from another of the objects, a parameter in a first message issued for the linked method, and a post-processing section coded in a computer language, interpreting a second message which has been returned from the linked method, when executed, and is representative of a result from operation of the linked method, and notifying a first interpreter of a result from interpretation of the second message to determine a next object successively to be processed;

storing, in an icon storage, the program entities symbolized by the icons used in generating the diagram; and interpreting, with a second interpreter, the program sequence stored in the diagram storage using the program entities stored in the icon storage, whereby the program is interpreted with the second interpreter when executed, and executed by making correspondence of each of the program entities to one of the methods in one of the objects in the object library.

11. A computer readable product, comprising a recording medium storing computer readable information, the computer readable information including an object-oriented application program for an automatic transaction machine, said application program performing the steps of:

storing, in a diagram storage, a program sequence obtained from a diagram composed of a combination of icons, the combination of icons including at least two associated series of icons, each of the icons symbolizing a program entity that includes a function section linking said each icon with a method for one of card and passbook objects included in an object library, a pre-processing section coded in a computer language and defining, in response to a request provided from another of the objects, a parameter in a first message issued for the linked method, and a post-processing section coded in a computer language, interpreting a second message which has been returned from the linked method, when executed, and is representative of a result from operation of the procedure, and notifying a first interpreter of a result from interpretation of the second message to determine another one of the card and passbook objects next to be successively processed;

storing, in an icon storage, the program entities symbolized by the icons used in generating the diagram; and interpreting, with a second interpreter, the program sequence stored in the diagram storage using the program entities stored in the icon storage, whereby the program is interpreted with the second interpreter when executed, and executed by making correspondence of each of the program entities to one of the methods for one of the card and passbook objects in the object library.

12. An object-oriented, visual program development system for developing a program sequence comprising:

an object library including objects;

an icon storage for storing a program entity that is symbolized by a symbolizing icon among a plurality of icons and defines one of the objects in said object library; and a diagram generator for generating a diagram composed of a combination of the icons, said generator selectively combining selected ones of the objects of the library to form the program sequence by designing the diagram using a graphical user interface based on an object-oriented programming;

said diagram generator providing the program entity with a function section linking the symbolizing icon with a method for a particular object included in said object library, a pre-processing section for the particular object coded in a computer language and defining, in response to a request provided from another of the objects in said object library, a parameter in a first message issued for the linked method, and a post-processing section coded in a computer language, interpreting a second message which has been returned from the method, when executed, and is representative of a result from operation of the method, and notifying an interpreter of a result.

13. The program development system in accordance with claim 12, wherein said program entity symbolized by said icon further comprises a data section for storing internal local variables and/or constants.

14. The program development system in accordance with claim 12, further comprising a coding device for coding, in a process of generating said diagram, said pre-processing section and post-processing section by the computer language.

15. The program development system in accordance with claim 12, further comprising a program code display device for displaying, in a process of generating said diagram, a window for inputting program codes to said pre-processing section and post-processing section.

16. The program development system in accordance with claim 12, further comprising a converter for converting said diagram into the program sequence coded in an intermediate language interpretable by an interpreter included in a processor using the program sequence.

17. The program development system in accordance with claim 12, further comprising a converter for converting said diagram into a program sequence in a form executable by a processor using the program sequence.

18. The program development system in accordance with claim 12, further comprising a converter for converting said diagram into a program sequence in an execute form in a process of generating said diagram sequence, said program sequence being generated by performing linkage and edition between the program entity symbolized by the icon and the object in the object library.

19. The program development system in accordance with claim 12, further comprising, as one of the icons used in a process of generating the diagram, a cancel icon for canceling, in response to a result from one of the icons, operation of at least another one of said icons.

\* \* \* \* \*